US008005498B2

(12) United States Patent  
Ruotsi

(10) Patent No.: US 8,005,498 B2  
(45) Date of Patent: Aug. 23, 2011

(54) MOBILE GROUP DATA DISTRIBUTION

(75) Inventor: Wendell Ruotsi, Portland, OR (US)

(73) Assignee: QUALCOMM Incorporated, San Diego, CA (US)

( * ) Notice: Subject to any disclaimer, the term of this patent is extended or adjusted under 35 U.S.C. 154(b) by 1005 days.

(21) Appl. No.: 11/859,345

(22) Filed: Sep. 21, 2007

(65) Prior Publication Data

US 2009/0082051 A1   Mar. 26, 2009

(51) Int. Cl.
H04B 7/00   (2006.01)
(52) U.S. Cl. ........ 455/518; 455/519; 455/520; 455/90.2
(58) Field of Classification Search .......... 455/517–520, 455/90.2, 78, 79, 500, 426.1, 412.1, 414.1, 455/416, 420; 370/352, 389, 338, 328
See application file for complete search history.

(56) References Cited

U.S. PATENT DOCUMENTS

| | | | |
|---|---|---|---|
| 6,219,694 | B1 | 4/2001 | Lazaridis et al. |
| 6,327,594 | B1 | 12/2001 | Van Huben et al. |
| 6,389,423 | B1 | 5/2002 | Sakakura |
| 6,389,457 | B2 | 5/2002 | Lazaridis et al. |
| 6,401,113 | B2 | 6/2002 | Lazaridis et al. |
| 6,463,463 | B1 | 10/2002 | Godfrey et al. |
| 6,463,464 | B1 | 10/2002 | Lazaridis et al. |
| 6,701,378 | B1 | 3/2004 | Gilhuly et al. |
| 6,779,019 | B1 | 8/2004 | Mousseau et al. |
| 6,889,333 | B2 | 5/2005 | Lawrence et al. |
| 6,941,349 | B2 | 9/2005 | Godfrey et al. |
| 7,076,244 | B2 | 7/2006 | Lazaridis et al. |
| 7,107,341 | B2 | 9/2006 | Mousseau et al. |
| 2002/0103935 | A1 | 8/2002 | Fishman et al. |
| 2005/0086384 | A1 | 4/2005 | Ernst |
| 2005/0091595 | A1 | 4/2005 | Shappell et al. |
| 2005/0226166 | A1 | 10/2005 | Agrawal et al. |
| 2005/0262530 | A1 | 11/2005 | Ruetschi et al. |
| 2006/0159090 | A1 | 7/2006 | Chang et al. |
| 2006/0287890 | A1 | 12/2006 | Stead et al. |
| 2007/0050448 | A1 | 3/2007 | Gonen et al. |
| 2010/0262478 | A1* | 10/2010 | Bamborough et al. .... 705/14.16 |

FOREIGN PATENT DOCUMENTS

| | | |
|---|---|---|
| WO | 0133362 | 5/2001 |
| WO | 2005038609 | 4/2005 |
| WO | 2007031708 | 3/2007 |

OTHER PUBLICATIONS

International Search Report, PCT/US2008/076508, International Searching Authority, European Patent Office, Jul. 6, 2010.
Written Opinion, PCT/US2008/076508, International Searching Authority, European Patent Office, Jul. 6, 2010.

* cited by examiner

Primary Examiner — Dominic E Rego
(74) Attorney, Agent, or Firm — Gerald P. Joyce, III; Richard A. Bachand

(57) ABSTRACT

A mobile collaborative community system provides distribution of shared data (e.g., media, preference, calendar, contacts, tasks, etc.) for a group of individuals (e.g., families, business organization, team, project, etc.) to the mobile devices of the group members. The system maintains a central repository or database of shared data for groups, as well as information defining the groups, user membership in the groups, and the mobile devices associated with the users. The system distributes the shared data for a group to the mobile devices of the user who are members of the group. The users can make changes to shared group data on their mobile devices, which changes are returned to the central repository and re-distributed to update the shared data on the mobile devices of all group members.

16 Claims, 4 Drawing Sheets

MOBILE GROUP DATA DISTRIBUTION

BACKGROUND

Description of Related Art

In current times, peoples generally rely on mobile communication systems to facilitate collaboration among a group of people (such as, families, business associates, team or project members, etc.). They interact with others via electronic mail, instant messaging, text messaging, calendaring, voice mail, telephone/mobile phone calling, and so on. Even when the primary interaction is to be an in person meeting, the communication systems are often relied upon to arrange time, place and participants of the meeting or appointment.

For effective group collaboration, it is often also helpful for members of the group to collectively share information. Examples of commonly shared group data include calendar information, contact information, to-do and project planning information, media (e.g., documents, audio and video, photos, etc.), software applications, and other information. Moreover, the group members preferably have access to the shared information available to them wherever they are located at any time. Further, various members of the group may need to make changes to the data, which updates also need to be accessible by other members of the group. New members may be added to the group, who will also require access to the current group information.

In the past, group data has often been shared by posting the data in a central location accessible to all group members. For example, the information can be posted to a bulletin board, wall calendar, chalkboard or whiteboard. Any changes to the data are made at the central location, and individual members are responsible for regularly checking the central location for any updates. As group work has moved to collaborating via electronic communication systems, a similar approach has been taken. Groups post shared data to a central site, such as a web-based calendar, bulletin board, or message posting forums. Any changes or new information is posted on the central site, and members again remain responsible to check that site regularly for updates.

SUMMARY

The following Detailed Description presents techniques and tools for mobile group data distribution that manages distribution of shared information for a group to mobile devices of the group members. The mobile group data distribution techniques can be embodied in a mobile collaborative community system and mobile devices, along with methods of operation and use of such systems and devices, and products.

The mobile group data distribution techniques described herein maintain a central repository of the shared group data for a group or groups, along with a central database of information that defines groups, users, users' memberships in the groups, and mobile devices associated with the users. The group data distribution techniques distribute the shared group data of a group to the mobile devices of the respective group's members. Members of the group can make changes to the group data from their mobile devices, and have the changes returned to the central repository. These changes are then re-distributed to the mobile devices of the group members to update the shared group data on those mobile devices.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following description relates to techniques for mobile group data distribution. The following description describes an example implementation of the techniques in the context of a mobile collaborative community system. For purposes of illustration, this exemplary mobile collaborative community system incorporating this technique is a communication network, incorporating mobile communication devices, such as mobile communications devices with telephone, voice mail, email, and text messaging. The technique does not require that the mobile collaborative community system uses any particular communication technology, but rather can be applied to communications, technologies in general that provide communication or interaction between a user and his or her contacts.

1. Example Mobile Collaborative Community System Architecture

Figure 1:
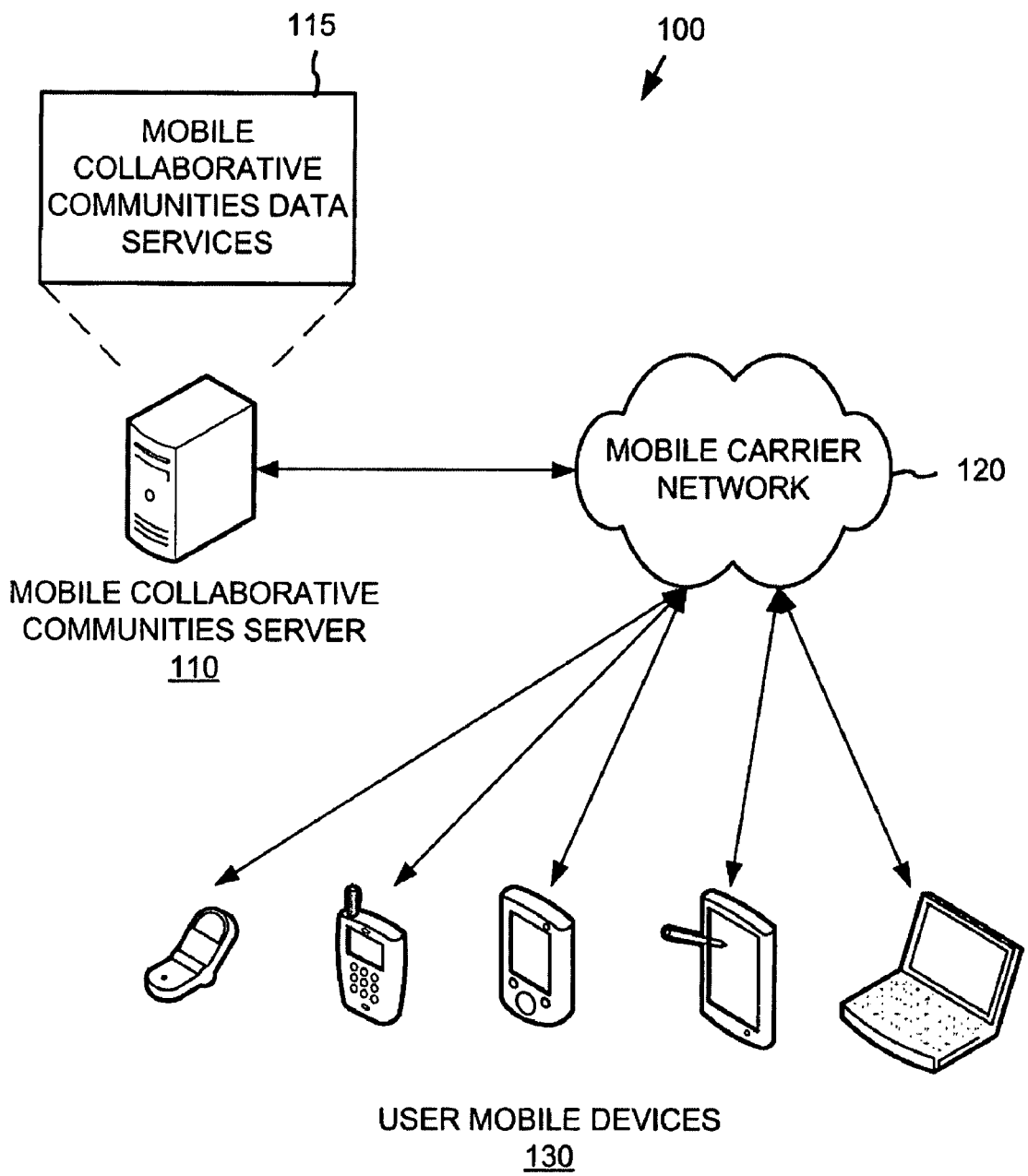
FIG. 1 is a block diagram of a mobile collaborative community system, in which the described mobile group data distribution techniques are applied.

In one example implementation, the techniques described herein are implemented in a communication system designed to provide collaboration among a community of people via mobile devices (e.g., mobile phone, laptop, pagers, and etc.), which is herein termed a mobile collaborative community system 100 and illustrated in FIG. 1. The system can be designed for general purpose use by any group or community of people, or have features specific to use by a particular community (e.g., sales force or other type business organization; a sports team, youth group, on-line multi-player gamers or other activities group; a religious, cultural, charity or non-profit; family; among other communities or groups of people).

With reference to FIG. 1, the mobile collaborative community system 100 provides a set of data services 115 for users of mobile communication devices 130, such as mobile phones, smart phones, handheld computers (also known as personal digital assistants or PDAs), tablet and laptop computers, among other mobile communication devices. The mobile collaborative community data services 115 are run on one or more server computers 110 of a data center, which are networked to communicate with the mobile communication devices 130 via a mobile carrier network 120. The mobile collaborative community data services include data services to support collaborative applications such as calendaring, meeting, contact management, data and document sharing, and other applications.

The server computers 110 and mobile communication devices 130 generally include at least one processing unit, a memory and storage for holding data and program instructions, communication connections with other computers and devices, and input/output capabilities. Various features and capabilities can be realized in the server computers and mobile communications devices via software programming thereof, including by program instructions and procedures carried on a computer-readable storage medium or media which are accessed by and executed on the processing unit.

Figure 2:
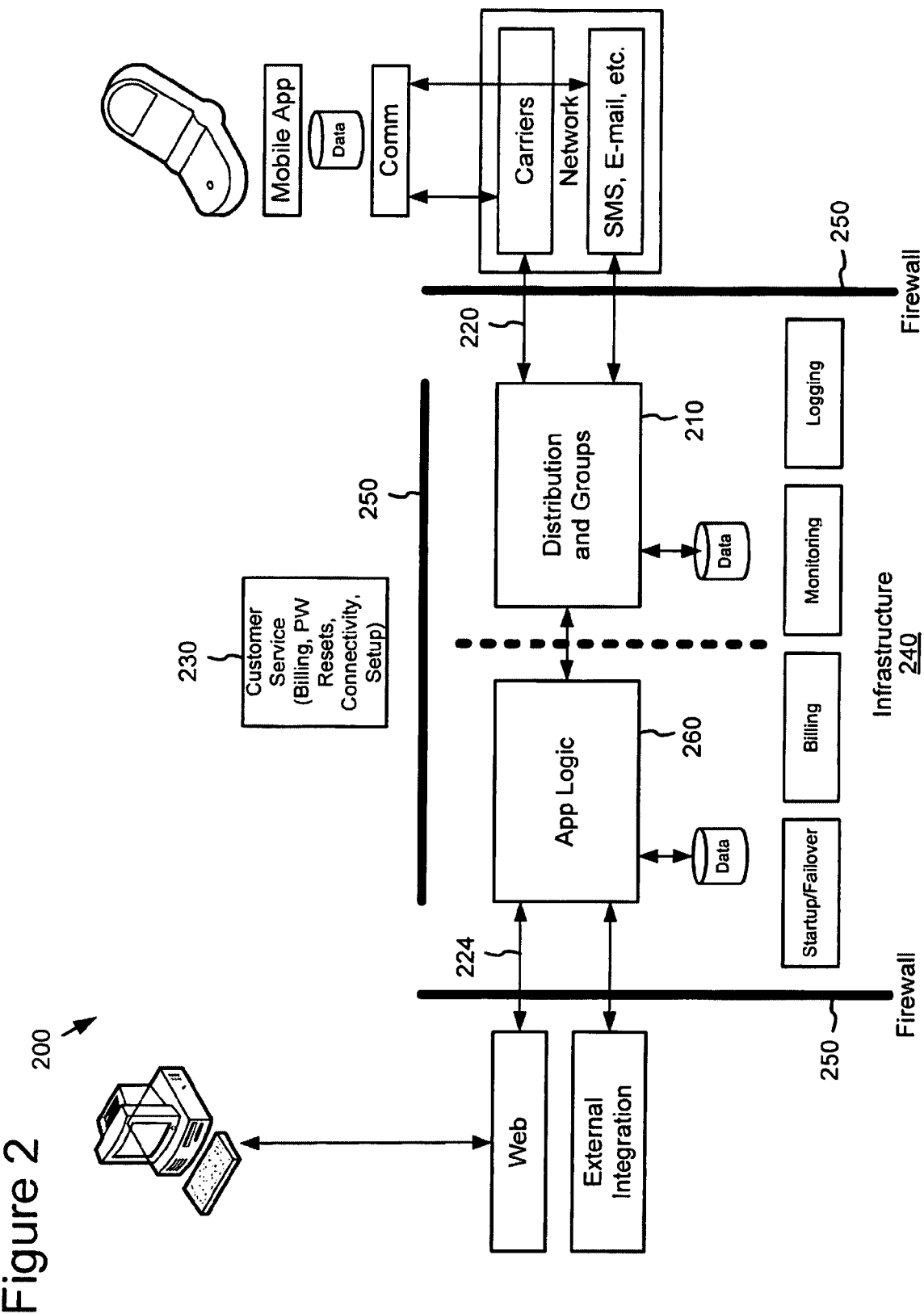
FIG. 2 is a more detailed block diagram of one example implementation of the mobile collaborative community-system of FIG. 1.

FIG. 2 illustrates in more detail a possible system architecture 200 for the mobile collaborative community system that provides the collaborative community services 115 (FIG. 1) to user mobile devices 130 (FIG. 1). The illustrated system architecture 200 includes a set of servers (such as may be housed in a data center) that provide data distribution and group management 210, over-the-air (OTA) protocols 214, device side application programming interfaces (APIs) 220, system backend APIs 224 (typically web-based), customer service capabilities 230 (including billing, password reset, connectivity and set up) and infrastructure 240 (such as, data and connection security, billing, logging, monitoring and failover capability). The architecture also includes firewalls 250 at the data center's connections with external networks, systems and devices (e.g., carrier networks, the Internet, and users' mobile communication devices), and with the customer service capabilities 230. The system defines a community model via the group management capabilities that encompasses users, groups of users, and potentially groups of groups. Groups can be "self" managed by users with an invitation model or can be externally managed by an enterprise or other organization. Membership in a group can be "read-only" or "read-write". Users can control what personal information is shared with each group.

Various applications 260 can be layered on top of the group management and distribution capabilities of the mobile collaborative community system. Examples of applications include calendar, sales force-automation, online gaming portal, meeting and document sharing, sports team management, and so on.

2. Mobile Group Data Distribution

The mobile collaborative community system 100 (FIG. 1) implements tools and techniques for mobile group data distribution, which shares data among a group of individuals by associating the data with the group and distributing that data via wireless or wired data networks to the individuals' mobile devices.

Figure 3:
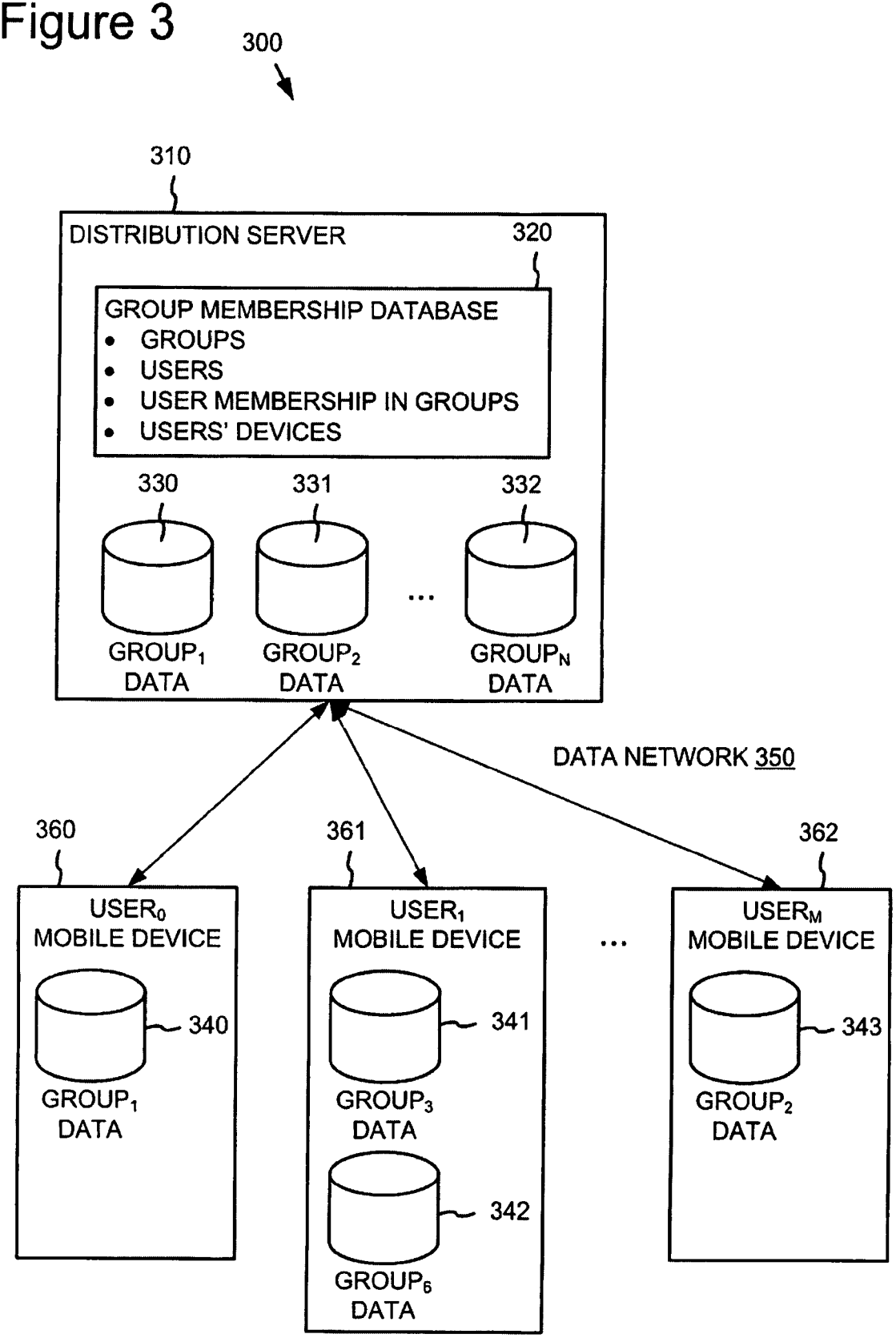
FIG. 3 is a data flow diagram depicting a general data flow within the mobile collaborative community system using the mobile group data distribution.

FIG. 3 presents a simplified model of the mobile group data distribution. A distribution server 310 serves as a central repository for shared group data. The distribution server 310 maintains a group membership database 320, which contains information defining the groups for which the distribution server handles mobile group data distribution. The group membership database 320 further contains information defining users, the users' memberships in the groups, and the users' mobile devices. Accordingly, the group membership database can be queried to identify the mobile devices associated with the users that are members of a particular group. The distribution server 310 can be implemented as a relational database.

The distribution server 310 also stores a central copy of the shared data 330-332 associated with each group. The shared data can be stored in the form of a file or data stream in a storage system (e.g., hard disk array or other persistent data storage devices) associated with the distribution server. The contents of the shared data for a group can include a data set of various data that is to be shared among the group members, such as media (e.g., audio, video, photographs, documents), information databases, contact information, to-do lists, software applications (e.g., productivity applications, games, etc.), and so on.

The distribution server 310 operates to distribute each group's shared data and changes to the shared data out to all the mobile devices 360-362 of the members of each group via a data network 350. In this way, each member's mobile device 360-362 will have a copy of the shared data for the groups to which the mobile device's user belongs. For example, a first user (e.g., user0) who belongs only to one group (e.g., group1) will, have the group data 340 of that group distributed to his or her mobile device 360. Another user (e.g., user1) who belongs to two groups (e.g., group3 and group6) will have the shared data 341, 342 for those groups on his or her mobile device 361.

In this mobile group data distribution model 300, the users also have the capability to make changes to the shared group data on their mobile device. Such changes are returned to the distribution server 310, where the changes are applied to the version 330-332 of the respective group shared data that is centrally stored at the distribution server. The distribution server 310 then also distributes the changes to mobile devices of other users that are members of the group, so that the shared group data is updated with the changes on each group member's mobile device.

Figure 4:
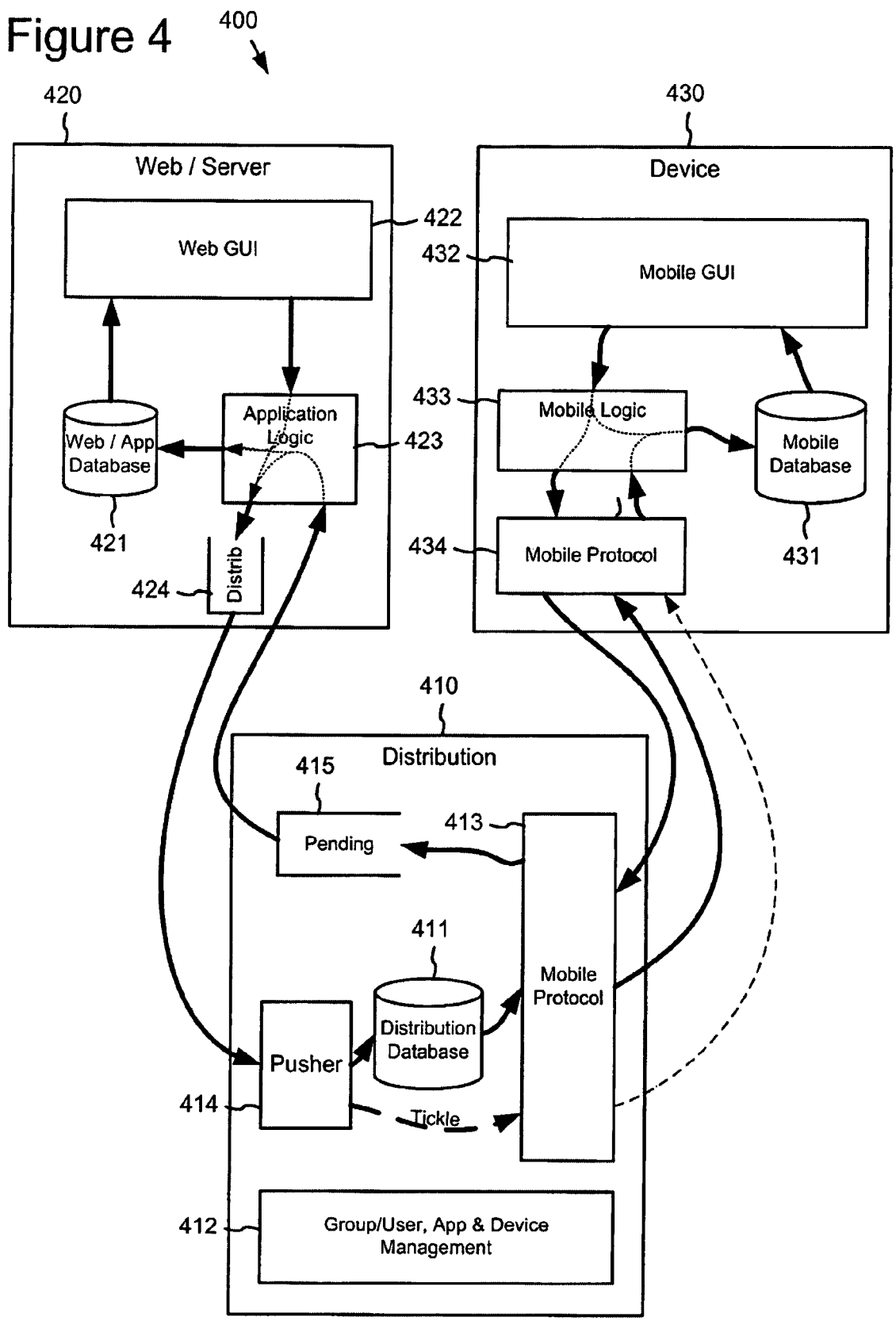
FIG. 4 is a data flow diagram depicting one example implementation of the mobile group data distribution techniques in the mobile collaborative community system of FIG. 2.

FIG. 4 illustrates data flow for a more detailed example implementation of the mobile group data distribution model 300 (FIG. 3) within the mobile collaborative community system 200 (FIG. 2). In this example implementation, the mobile group data distribution is coordinated with data transfers or message exchanges between three segments: the distribution server 210, the application server 260, and the user mobile devices 130. Although the data flow is shown for ease of illustration with a single distribution server, application server and user mobile device, it should be understood that each of these segments can include any number of servers or devices, which may be in a cluster configuration, to provide scaling of the group data distribution service to a desired number of mobile devices 130.

The application server 260 has an application database 421, a Web graphical user interface (GUI) 422, application logic 423, and a distribution queue 424 that holds changes to the shared group data for distribution by the distribution server 210. The web GUI 422 provides a user-facing user interface based on Web (Internet) standards (e.g., interactive web pages or forms) that allows users to interact with the collaborative community application(s) via an Internet connection (e.g., from a web browser or other web-enable application on a computer connected to the Internet, which accesses the collaborative community system through the Internet). Alternatively, in the case of some applications, the user-facing GUI for the application server 260 need not be web-enabled, or may be omitted.

The application logic 423 is the software that provides the programming logic or functionality of the collaborative community application(s) 260 (FIG. 2). The application logic processes the content of the shared group data for the application, and processes any changes made to the shared group data of that application made by a user either via the web GUI 422 or from the users' mobile devices 130. All data changes, whether user initiated or device initiated, go through the application logic 423 on the application server. This provides a convenient, single point in the data flow to add or modify related data and to massage data (for example, to do voice recognition) before the shared data is distributed to user mobile devices 130.

The application logic 423 and web GUI 422 store information needed for their operation in the application database 421. The application database 421 of the application server 260 in this section is structured to make application functionality easier. More particularly, unlike the distribution server, the data is not structured as an opaque stream or blob (binary large object). Instead, the data can be structured as a database containing tables having records with the fields broken out and indexed appropriately to the application.

Finally, the application server 260 interfaces with the distribution server 210 via the distribution queue 424. After changes are made to the shared group data of the application, the distribution logic 424 queues up the shared group data changes in the distribution queue 424 for the distribution server 210 to distribute out to the mobile devices 130. The distribution queue 424 can be implemented using the Java Messaging Services (JMS) or Microsoft Message Queuing (MSMQ) messaging infrastructure platforms.

The distribution server 210 is responsible for moving the shared data for each group between the application server 260 and the mobile devices 130 associated with that group's users. The distribution server contains a distribution database 411, and programming for group/application/user/device management 412, a mobile protocol 413 and a pusher 414. Additionally, the distribution server contains a pending queue 415 to hold changes made to the shared group data at the user mobile devices 130 for processing by the application server 260. The pending change queue 415 also can be implemented using the Java Messaging Services (JMS) or Microsoft Message Queuing (MSMQ) messaging infrastructure platforms.

The distribution server 210 manages the shared group data as opaque streams or blobs. In other words, the distribution server 210 simply moves and stores the shared group data in the distribution database 411 as a unitary block, and does not perform processing based on its contents. Accordingly, the shared group data when stored in the distribution database 411 of the distribution server need not be broken out in a database structure with separate fields or indexing.

The distribution server 210 contains management tools 412 for administering the information in the group membership database 320 (FIG. 3) that defines the groups, users, user membership in groups and mobile devices associated with the users. In addition, the distribution server 210 also can manage and record information as to which application(s) are stored on the individual user mobile devices. This allows the distribution server 210 to further limit distribution of group data on an application basis. In other words, the distribution server distributes the shared group data for a particular application to only those mobile devices of group members that support the respective application.

The mobile protocol 413 of the distribution server 210 implements one side of the protocol for data transfer to the user mobile devices. In this example implementation, the distribution server performs data transfers of the group data to mobile devices using a "tickle and pull" protocol. More particularly, when the application server 260 queues changed group data for distribution, the pusher 414 generates a tickle message to be sent to the user mobile devices 130 associated with the users in the group. The tickle message notifies the user mobile devices that a change to the group data is available. The user mobile devices 130 thereafter initiate a data transfer via the mobile protocol 413 to pull the group data change to the mobile device.

The user mobile device 130 contains the user-facing mobile user interface 432, and also the mobile device portion of the application logic 433. The user mobiles device 130 also contains a mobile database 431 that stores the group data for the group's to which the user of the mobile device belongs. Unlike that distribution server, the mobile database is structured to make application functionality easier. Accordingly, the data is not simply stored as opaque blobs, but as a database table with records with the fields broken out and indexed appropriately (or other format appropriate to the application).

The user interface 432 and application logic 433 permit the user to interact with the group data for the application, or in other words provide the functionality of the application to the user on the mobile device. This application functionality can cause the group data to change. For example, the user of a collaborative sales force automation application can enter or modify data for the group's sales activities on the user's mobile device. As a further example, the user could modify appointment data of a group calendar application, or task data in a team project management application.

The mobile protocol 434 in the user mobile device implements the mobile device side of the data transfer to and from the user mobile device. Upon being notified by the tickle message from the distribution server of an update to the group data being available, the device-side mobile protocol 434 initiates the data transfer of the group data changes. The mobile protocol 434 interfaces with the mobile application logic to apply the changes to the group data stored in the mobile database 431. When changes are made to the group data of the application on the user mobile device, the mobile protocol 434 queues the group data change until a next time that the user mobile device connects with the distribution server.

The mobile protocol 434 has information as to which applications are installed on the user mobile device and which groups its user is a member of. The mobile protocol uses this information to initiate data distribution for such groups and applications. In this example implementation, the application registration is managed locally on the user mobile device 130, while group membership is managed remotely at the distribution server (by the management tools 412) and distributed as a group configuration stream to the mobile protocol 434 on the user mobile device.

In the illustrated data flow shown in FIG. 4, the distribution of group data for an application is based on a group identifier and the application in question. As previously described, the distribution server 210 distributes the group data to those of the user mobile devices 130 that are associated with users who are members of the respective group, and have the application on the mobile device. On the other hand, change data is returned from all user mobile devices to the application server for the application, regardless of the user mobile device's association with groups. In addition, the distribution server 210 and user mobile device 130 assigns consecutive sequence numbers to keep track of a sequence of changes made to the group data. The sequence numbers can be assigned to the group data as a whole, or more preferably to individual records or segments of the group data. The sequence numbers are used by the mobile protocol 413, 434 to determine which of a sequence of changes have been distributed and applied by any particular one of the user mobile devices 130. The sequence number of the last change distributed to a particular device is remembered (either at the device end or distribution server side). When that device next connects to the distribution server, this sequence number of the last distributed change is used as a starting point for distributing subsequent changes to the device. The distribution server then distributes changes with sequence numbers after that of the last distributed change.

More particularly, the data flow for distribution of the group data when a change is made from a user mobile device is as follows:

1. The user makes a change to the group data using the mobile GUI 432 on the user mobile device 130.
2. The mobile GUI 432 submits the change to the mobile logic 433 for the application on the user mobile device 130.
3. The mobile logic 433 makes local changes to the group data in the mobile database 431. The mobile logic 433 also packages up and queues the change data for distribution with the mobile protocol 434. The mobile protocol assigns local sequence number to the changed records of the group data.
4. At a later time (depending, for example, on connectivity with the distribution server, connection preference, and etc.), the user mobile device 130 connects with the distribution server 210 and transfer the change data to the distribution server.
5. The distribution server 210 queues the change data for processing by the application logic 423 on the application server 260 in the pending change queue 415.
6. The application logic 423 processes the changes, potentially adding new records that correlate with the changes, deleting old records that no longer apply or even modifying the changed record, in accordance with the functionality of the application as defined in the application logic. The application logic applies these changes to the application database 421 on the application server 260. The application logic also packages up and queues the resulting change data in the distribution queue 424 for distribution to the user mobile devices. The application logic assigns a global sequence number to the changed records of the group data.
7. The pusher 414 on the distribution server 210 retrieves the change data from the distribution queue, and makes decisions based on group membership and installed application about which of the user mobile devices is to have the data distributed to them. The pusher 414 adds the changed group data along with its assigned global sequence number to the distribution database 411, and issues tickle messages to the user mobile devices to which the group data is distributed.
8. Sometime later (e.g., in response to the tickle message, or based on connection preferences), the user mobile devices 130 connect with the distribution server 210 and have the mobile protocol 413 transfer the changed group data to the appropriate user mobile devices.
9. As each change is transferred in sequence to a user mobile device, the mobile protocol 413, 434 records metadata concerning the changed group data and passes the packaged changes to the mobile logic 433. The mobile logic 433, in turn, unpackages the changes and saves those changes to the group data in the mobile database 431. In addition, the mobile logic 433 updates any running mobile GUI 432 on the user mobile device 130, and resets any timers that relate to the changes data.

In view of the many possible embodiments to which the principles of our invention may be applied, we claim as our invention all such embodiments as may come within the scope and spirit of the following claims and equivalents thereto.

What is claimed is:

1. A method of distributing shared data for a group of individuals to the individuals' mobile devices, the method comprising:
   maintaining a central copy of the shared data in a central repository;
   maintaining centrally stored group membership information defining at least one group, mobile device users who are members of the at least one group, and mobile devices associated with the mobile device users;
   distributing the shared data for a particular one of the at least one group to the mobile devices of the mobile device users belonging to said particular group;
   storing the distributed shared data on the mobile devices of the mobile device users belonging to said particular group for accession said mobile devices via a mobile user interface on said mobile devices, the mobile devices having a user interface for the users to interactively make changes to the shared data stored on the respective user's mobile device;
   returning information from the mobile devices of any changes made to the shared data on the mobile devices;
   updating the central copy of the shared data in the central repository with the changes, and
   distributing information of the changes to the shared data in the central repository to the mobile devices of the mobile device users belonging to said particular group;
   wherein the group membership information further defines applications available on the individual mobile devices, and wherein distributing the shared data and information of the changes to the shared data is to only those of the mobile devices of the mobile device users belonging to said particular group that have an application for the shared data available.

2. The method of claim 1 wherein the distributing the shared data and information of the changes comprises using a tickle and pull data transfer protocol to transfer the shared data and information of the changes from the central repository to the mobile devices.

3. A method of distributing shared data for a group of individuals to the individuals' mobile devices, the method comprising:
   maintaining a central copy of the shared data in a central repository;
   maintaining centrally stored group membership information defining at least one group, mobile device users who are members of the at least one group, and mobile devices associated with the mobile device users;
   distributing the shared data for a particular one of the at least one group to the mobile devices of the mobile device users belonging to said particular group;
   storing the distributed shared data on the mobile devices of the mobile device users belonging to said particular group for accession said mobile devices via a mobile user interface on said mobile devices, the mobile devices having a user interface for the users to interactively make changes to the shared data stored on the respective user's mobile device;
   returning information from the mobile devices of any changes made to the shared data on the mobile devices;
   updating the central copy of the shared data in the central repository with the changes; and
   distributing information of the changes to the shared data in the central repository to the mobile devices of the mobile device users belonging to said particular group;
   wherein the distributing the shared data and information of the changes comprises using a tickle and pull data transfer protocol to transfer the shared data and information of the changes from the central repository to the mobile devices.

4. The method of claim 3 wherein the group membership information further defines applications available on the individual mobile devices, and wherein distributing the shared data and information of the changes to the shared data is to only those of the mobile devices of the mobile device users belonging to said particular group that have an application for the shared data available.

5. A data distribution system for distributing data shared by a group of mobile device users to the users' mobile devices, the system comprising:
- a group membership database having information defining at least one group, a plurality of users, membership of the users in the at least one group, and association of a plurality of mobile devices with the users;
- a central repository containing at least one unit of data shared by one of the at least one group;
- a distribution server operating to distribute a shared data unit for a group to mobile devices associated with users belonging to said group per the information of the group membership database, wherein the distribution server further operates to receive change data returned from the mobile devices that defines a change to the shared data unit made by any of said users of said group on such user's mobile device, and further operating to distribute the change data to the mobile devices associated with said users belonging to said group per the information of the group membership database, whereby the data distribution system maintains the data shared by the group of mobile device users distributed to the users' mobile devices updated with any changes made by the users on the users' mobile devices; and
- an application server containing application logic for processing the change data and applying the change to the data in the central repository.

6. The data distribution system of claim 5 further comprising: an application server containing application logic for processing the change data and applying the change to the data in the central repository.

7. The data distribution system of claim 6 wherein the information in the group membership database further defines availability of at least one application on the mobile devices, wherein the shared data unit pertains to one of the at least one application, the distribution server operating to distribute the shared data unit and change data to only those mobile devices of users belonging to said group on which said one application is available per the information in the group membership database.

8. The data distribution system of claim 6 wherein the distribution server distributes the shared data unit and change data to the mobile devices using a tickle and pull mobile data transfer protocol.

9. A data distribution system for distributing data shared by a group of mobile device users to the users' mobile devices, the system comprising:
- a group membership database having information defining at least one group, a plurality of users, membership of the users in the at least one group, and association of a plurality of mobile devices with the users;
- a central repository containing at least one unit of data shared by one of the at least one group;
- a distribution server operating to distribute a shared data unit for a group to mobile devices associated with users belonging to said group per the information of the group membership database, wherein the distribution server further operates to receive change data returned from the mobile devices that defines a change to the shared data unit made by any of said users of said group on such user's mobile device, and further operating to distribute the change data to the mobile devices associated with said users belonging to said group per the information of the group membership database, whereby the data distribution system maintains the data shared by the group of mobile device users distributed to the users' mobile devices updated with any changes made by the users on the users' mobile devices; and
- an application server containing application logic for processing the change data and applying the change to the data in the central repository;
- wherein the information in the group membership database further defines availability of at least one application on the mobile devices, wherein the shared data unit pertains to one of the at least one application, the distribution server operating to distribute the shared data unit and change data to only those mobile devices of users belonging to said group on which said one application is available per the information in the group membership database.

10. The data distribution system of claim 9 wherein the distribution server further operates to assign sequence numbers to the change data returned from mobile devices in sequence, and operates when a mobile device connects to the distribution server to distribute the change data assigned sequence numbers after that of the last change data received by that mobile device for groups to which the mobile device's user belongs.

11. A data distribution system for distributing data shared by a group of mobile device users to the users' mobile devices, the system comprising:
- a group membership database having information defining at least one group, a plurality of users, membership of the users in the at least one group, and association of a plurality of mobile devices with the users;
- a central repository containing at least one unit of data shared by one of the at least one group;
- a distribution server operating to distribute a shared data unit for a group to mobile devices associated with users belonging to said group per the information of the group membership database, wherein the distribution server further operates to receive change data returned from the mobile devices that defines a change to the shared data unit made by any of said users of said group on such user's mobile device, and further operating to distribute the change data to the mobile devices associated with said users belonging to said group per the information of the group membership database, whereby the data distribution system maintains the data shared by the group of mobile device users distributed to the users' mobile devices updated with any changes made by the users on the users' mobile devices; and
- an application server containing application logic for processing the change data and applying the change to the data in the central repository;
- wherein the distribution server distributes the shared data unit and change data to the mobile devices using a tickle and pull mobile data transfer protocol.

12. The data distribution system of claim 11 wherein the distribution server further operates to assign sequence numbers to the change data returned from mobile devices in sequence, and operates when a mobile device connects to the distribution server to distribute the change data assigned sequence numbers after that of the last change data received by that mobile device for groups to which the mobile device's user belongs.

13. A mobile collaborative community system comprising:
- a plurality of mobile devices operated by a plurality of users, the mobile devices containing an implementation of at least one of a plurality of applications and a mobile end of a data transfer protocol;

a central repository of data shared by groups of the users for the applications;

a distribution server having group membership information defining which of the mobile devices are operated by users of each group and which of the applications are implemented on the mobile devices, the distribution server containing an implementation of a server end of the data transfer protocol, the distribution server operating to distribute the data in the central repository to the mobile devices according to the membership of the user of the mobile devices in the groups and availability of the applications on the mobile devices using the data transfer protocol, wherein the distribution server further operates to receive in return from the mobile device mobile change data for changes made by the users operating the mobile devices to the shared data, and the distribution server further operating to distribute update data based on the change data to the mobile devices according to the membership of the user of the mobile devices in the groups and availability of the applications on the mobile devices using the data transfer protocol; and an application server containing application logic for processing the change data, applying changes defined by the change data to update the shared data in the central repository, and generate the update data for distribution to the mobile devices.

14. The mobile collaborative community system of claim 13 wherein the data transfer protocol is a tickle and pull mobile data transfer protocol.

15. A mobile collaborative community system comprising:

a plurality of mobile devices operated by a plurality of users, the mobile devices containing an implementation of at least one of a plurality of applications and a mobile end of a data transfer protocol;

a central repository of data shared by groups of the users for the applications; and a distribution server having group membership information defining which of the mobile devices are operated by users of each group and which of the applications are implemented on the mobile devices, the distribution server containing an implementation of a server end of the data transfer protocol, the distribution server operating to distribute the data in the central repository to the mobile devices according to the membership of the user of the mobile devices in the groups and availability of the applications on the mobile devices using the data transfer protocol, wherein the distribution server further operates to receive in return from the mobile device mobile change data for changes made by the users operating the mobile devices to the shared data, and the distribution server further operating to distribute update data based on the change data to the mobile devices according to the membership of the user of the mobile devices in the groups and availability of the applications on the mobile devices using the data transfer protocol;

wherein the distribution server further operates to assign sequence numbers to the update data for the change data returned from mobile devices in sequence, and operates when a mobile device connects to the distribution server to distribute the update data assigned sequence numbers after that of the last update data received by that mobile device for the group's shared data.

16. The mobile collaborative community system of claim 15 wherein the data transfer protocol is a tickle and pull mobile data transfer protocol.

* * * * *